United States Patent
Kida

(10) Patent No.: US 11,591,459 B2
(45) Date of Patent: Feb. 28, 2023

(54) THERMOPLASTIC ELASTOMER COMPOSITION

(71) Applicant: Sumitomo Chemical Company, Limited, Tokyo (JP)

(72) Inventor: Katsuya Kida, Rabigh (SA)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 951 days.

(21) Appl. No.: 16/334,434

(22) PCT Filed: Sep. 28, 2017

(86) PCT No.: PCT/JP2017/035223
§ 371 (c)(1),
(2) Date: Mar. 19, 2019

(87) PCT Pub. No.: WO2018/062391
PCT Pub. Date: Apr. 5, 2018

(65) Prior Publication Data
US 2020/0407541 A1 Dec. 31, 2020

(30) Foreign Application Priority Data
Sep. 30, 2016 (JP) .............................. JP2016-193000

(51) Int. Cl.
C08L 23/16 (2006.01)
C08J 3/20 (2006.01)
C08J 3/24 (2006.01)
C08L 91/00 (2006.01)

(52) U.S. Cl.
CPC .............. *C08L 23/16* (2013.01); *C08J 3/201* (2013.01); *C08J 3/24* (2013.01); *C08L 91/00* (2013.01); C08L 2207/322 (2013.01); C08L 2312/00 (2013.01)

(58) Field of Classification Search
CPC ...... C08L 23/12; C08L 23/16; C08L 23/0815; C08L 2312/00; C08J 3/24
See application file for complete search history.

(56) References Cited

U.S. PATENT DOCUMENTS

| | | | | |
|---|---|---|---|---|
| 6,153,704 A | * | 11/2000 | Kodama | C08L 23/16 525/240 |
| 6,399,696 B1 | * | 6/2002 | Toyosawa | C08K 5/01 524/505 |
| 7,326,740 B2 | * | 2/2008 | Stadler | B27N 3/002 524/13 |
| 2007/0299181 A1 | | 12/2007 | Nakata et al. | |
| 2016/0032089 A1 | | 2/2016 | Takahashi | |
| 2016/0244599 A1 | | 8/2016 | Kurokawa | |

FOREIGN PATENT DOCUMENTS

| | | | | |
|---|---|---|---|---|
| CN | 1944722 A | 4/2007 | | |
| CN | 105315549 A | 2/2016 | | |
| CN | 105906928 A | 8/2016 | | |
| EP | 446382 A1 | * | 9/1991 | .............. C08L 23/16 |
| EP | 1857501 A1 | 11/2007 | | |
| JP | H02158644 A | 6/1990 | | |
| JP | H04103647 A | 4/1992 | | |
| JP | H07011074 A | 1/1995 | | |
| JP | 2000178452 A | 6/2000 | | |
| JP | 2000204265 A | 7/2000 | | |
| JP | 2014062149 A | 4/2014 | | |
| JP | 2015218251 A | 12/2015 | | |
| JP | 2016011396 A | 1/2016 | | |
| KR | 20070030776 A | 3/2007 | | |
| WO | 2006016899 A1 | 2/2006 | | |

OTHER PUBLICATIONS

Office Action dated Jun. 1, 2021 in JP Application No. 2018542859.
Office Action dated Apr. 26, 2021 in KR Application No. 1020197011762.
Extended European Search Report dated May 28, 2020 in EP Application No. 17856340.9.
Office Action dated Feb. 2, 2021 in CN Application No. 201780060198.4.

* cited by examiner

*Primary Examiner* — Vu A Nguyen
(74) *Attorney, Agent, or Firm* — Panitch Schwarze Belisario & Nadel LLP

(57) ABSTRACT

A thermoplastic elastomer composition contains component (A-2), component (B), and component (C). The content of component (A-2) is 5 parts by weight or more and 95 parts by weight or less with respect to 100 parts by weight of the total amounts of components (A-2) and (B), and the content of component (C) is 0.005% by weight or more and 3% by weight or less with respect to 100% by weight of the whole amount of the thermoplastic elastomer composition. Component (A-2) is a crosslinked product of component (A-1), which is an ethylene copolymer containing a monomer unit derived from propylene and/or α-olefins having 4 to 10 carbon atoms, and a monomer unit derived from ethylene, and having a Mooney viscosity ($ML_{1+4}$, 125° C.) of 50 or more. Component (B) is a propylene polymer and component (C) is an antifungal agent.

8 Claims, No Drawings

THERMOPLASTIC ELASTOMER COMPOSITION

CROSS-REFERENCE TO RELATED APPLICATION

This application is a Section 371 of International Application No. PCT/JP2017/035223, filed Sep. 28, 2017, which was published in the Japanese language on Apr. 5, 2018, under International Publication No. WO 2018/062391 A1, which claims priority under 35 U.S.C. § 119(b) to Japanese Application No. 2016-193000, filed Sep. 30, 2016, the disclosures of which are incorporated herein by reference in their entirety.

TECHNICAL FIELD

The present invention relates to a thermoplastic elastomer composition.

BACKGROUND ART

Patent Document 1 describes a thermoplastic elastomer composition containing a crosslinked product of an ethylene-propylene-diene copolymer having a Mooney viscosity ($ML_{1+4}$, 125° C.) of 47, a polypropylene and an antifungal agent, as the thermoplastic elastomer composition having an antifungal property.

PRIOR ART DOCUMENT

Patent Document

Patent Document 1: Japanese Unexamined Patent Application Publication (JP-A) No. 2000-178452

SUMMARY OF THE INVENTION

Problem to be Solved by the Invention

The above-described thermoplastic elastomer composition has insufficient sustainability of an antifungal performance over a long period of time and there was a problem that the surface of the molded article made of the above-described thermoplastic elastomer composition is bleached.

In view of such current situation, the problem to be solved by the present invention is to provide a thermoplastic elastomer composition capable of maintaining an antifungal performance for a longer period of time and suppressing bleaching of the surface of the molded article caused by a bleeding of the antifungal agent, and a molded article thereof.

Means for Solving the Problem

The present invention provides the following [1] to [9].

[1] A thermoplastic elastomer composition comprising the following component (A-2), the following component (B) and the following component (C), wherein the content of the component (A-2) is 5 parts by weight or more and 95 parts by weight or less with respect to 100 parts by weight of the total amount of the component (A-2) and the component (B), and the content of the component (C) is 0.005% by weight or more and 3% by weight or less with respect to 100% by weight of the whole amount of the above-described thermoplastic elastomer composition;

component (A-2): a crosslinked product of a component (A-1);

component (A-1): an ethylene copolymer comprising a monomer unit derived from at least one selected from the group consisting of propylene and α-olefins having the number of carbon atoms of 4 or more and 10 or less, and a monomer unit derived from ethylene and having a Mooney viscosity ($ML_{1+4}$, 125° C.) of 50 or more;

component (B): a propylene polymer;

component (C): an antifungal agent.

[2] The thermoplastic elastomer composition according to [1], comprising the following component (E) in an amount of 1 part by weight or more and 100 parts by weight or less with respect to 100 parts by weight of the total amount of the component (A-2) and the component (B);

component (E): a mineral oil.

[3] The thermoplastic elastomer composition according to [1] or [2], wherein the melt flow rate of the component (B) measured at a temperature of 230° C. and a load of 21.18 N is 20 g/10 min or less.

[4] The thermoplastic elastomer composition according to any one of [1] to [3], wherein the component (C) is an organic nitrogen sulfur compound.

[5] The thermoplastic elastomer composition according to any one of [1] to [4], wherein the component (C) is thiabendazole.

[6] The thermoplastic elastomer composition according to any one of [1] to [5], wherein when the thermoplastic elastomer composition is hot press-molded at a temperature of 200° C. and a maximum pressure of 10 MPa for 3 minutes, then, cold press-molded at a temperature of 23° C. and a maximum pressure of 10 MPa for 5 minutes, to fabricate a molded article, the compression permanent set thereof measured under the following conditions is 80% or less;

measurement conditions of compression permanent set: the compression permanent set of the molded article is measured according to JIS K6262 at a test temperature of 70° C., a test time of 22 hours and a compression rate of 25%.

[7] A production method of the thermoplastic elastomer composition according to any one of [1] to [6], comprising a step (1-1) of melt-kneading the component (A-1), the component (B), the component (C) and the following component (D);

component (D): a crosslinking agent.

[8] A production method of the thermoplastic elastomer composition according to any one of [1] to [6], comprising a step (1-2) of melt-kneading the component (A-1), the component (B) and the component (D), to obtain a composition precursor, and a step (2-2) of melt-kneading the above-described composition precursor and the component (C).

[9] A molded article comprising the thermoplastic elastomer composition according to any one of [1] to [6].

Effect of the Invention

According to the present invention, it is possible to provide a thermoplastic elastomer composition capable of maintaining an antifungal performance for a longer period of time and suppressing bleaching of the surface of the molded article caused by bleeding of the antifungal agent, and a molded article thereof.

MODES FOR CARRYING OUT THE INVENTION (Composition Containing Crosslinked Product of Ethylene Copolymer (Component (A-2))

A crosslinked product of an ethylene copolymer (hereinafter, referred to as component (A-1) in some cases) having a monomer unit derived from at least one selected from the group consisting of propylene and α-olefins having the number of carbon atoms of 4 or more and 10 or less and, a monomer unit derived from ethylene and having a Mooney viscosity ($ML_{1+4}$, 125° C.) of 50 or more is hereinafter referred to as component (A-2). The ethylene copolymer as the component (A-1) has a Mooney viscosity ($ML_{1+4}$, 125° C.) of 50 or more.

The gel fraction of the component (A-2) is preferably 80% or more and 100% or less.

The gel fraction is determined by a method described below. About 1 g of the component (A-2) and an empty net basket (X) made of wire mesh (opening: 400 mesh) were weighed, respectively. The component (A-2) is placed on the net basket, and the net basket containing the component (A-2) is introduced into an extraction tube of a Soxhlet extractor, and 300 ml of o-xylene is introduced into a flask. An extraction treatment is conducted by refluxing for 24 hours. After the extraction treatment, the net basket is removed from the extraction tube, dried under reduced pressure at 100° C. in a vacuum drier, and the net basket (Y) after drying is weighed. The gel fraction (% by weight) is calculated according to the following formula.

Gel fraction=((weight of (Y)−weight of (X))/weight of measurement sample)×100

The component (A-2) can be obtained by cross-linking the component (A-1).

The cross-linking method includes a method of melt-kneading a composition containing the component (A-1) and a crosslinking agent (hereinafter, referred to as component (D) in some cases). Cross-linking may be conducted simultaneously in producing the thermoplastic elastomer composition of the present invention. In this case, a composition containing the component (A-2) and the component (B) can be produced by melt-kneading a composition containing the compound (A-1), a propylene polymer (hereinafter, referred to as component (B) in some cases) and the component (D).

The component (A-1) is an ethylene copolymer having no cross-linked structure, and its gel fraction is 0%.

The α-olefin having the number of carbon atoms of 4 or more and 10 or less includes, for example, 1-butene, 2-methylpropylene-1-pentene, 3-methyl-1-butene, 1-hexene, 4-methyl-1-pentene and 1-octene. The α-olefin having the number of carbon atoms of 4 or more and 10 or less may be used singly or in combination of two or more kinds thereof.

The monomer unit derived from at least one selected from the group consisting of propylene and α-olefins having the number of carbon atoms of 4 or more and 10 or less is preferably a monomer unit derived from propylene, a monomer unit derived from 1-butene or a monomer unit derived from 1-octene.

The component (A-1) may also have monomer units derived from other monomers, in addition to the monomer unit derived from at least one selected from the group consisting of propylene and α-olefins having the number of carbon atoms of 4 or more and 10 or less and the monomer unit derived from ethylene. The other monomer includes, for example, conjugated dienes having the number of carbon atoms of 4 or more and 8 or less such as 1,3-butadiene, 2-methyl-1,3-butadiene, 1,3-pentadiene, 2,3-dimethyl-1,3-butadiene and the like; non-conjugated dienes having the number of carbon atoms of 5 or more and 15 or less such as dicyclopentadiene, 5-ethylidene-2-norbornene, 1,4-hexadiene, 1,5-dicyclooctadiene, 7-methyl-1,6-octadiene, 5-vinyl-2-norbornene and the like; carboxylic acid vinyl esters such as vinyl acetate and the like; unsaturated carboxylic acid esters such as methyl acrylate, ethyl acrylate, butyl acrylate, methyl methacrylate, ethyl methacrylate and the like; and unsaturated carboxylic acids such as acrylic acid, methacrylic acid and the like. The other monomer is preferably a non-conjugated diene having the number of carbon atoms of 5 or more and 15 or less, more preferably 5-ethylidene-2-norbornene or dicyclopentadiene. The component (A-1) may contain two or more kinds of the monomer units derived from the other monomers.

In the component (A-1), the content of a monomer unit derived from ethylene is preferably 50% by weight or more and 95% by weight or less, more preferably 55% by weight or more and 85% by weight or less, with respect to 100% by weight of the total amount of a monomer unit derived from ethylene and a monomer unit derived from at least one selected from the group consisting of propylene and α-olefins having the number of carbon atoms of 4 or more and 10 or less. In the component (A-1), the content of a monomer unit derived from at least one selected from the group consisting of propylene and α-olefins having the number of carbon atoms of 4 or more and 10 or less is preferably 5% by weight or more and 50% by weight or less, more preferably 15% by weight or more and 45% by weight or less, with respect to 100% by weight of the total amount of a monomer unit derived from ethylene and a monomer unit derived from at least one selected from the group consisting of propylene and α-olefins having the number of carbon atoms of 4 or more and 10 or less.

The sum of the content of a monomer unit derived from ethylene and the content of a monomer unit derived from at least one selected from the group consisting of propylene and α-olefins having the number of carbon atoms of 4 or more and 10 or less is preferably 70% by weight or more, more preferably 80% by weight or more, with respect to 100% by weight of the whole amount of the component (A-1).

The content of a monomer unit derived from ethylene and the content of a monomer unit derived from at least one selected from the group consisting of propylene and α-olefins having the number of carbon atoms of 4 or more and 10 or less in the component (A-1) can be determined by infrared spectroscopy. Specifically, the infrared absorption spectrum of the component (A-1) is measured using an infrared spectrophotometer, and the content of a monomer unit derived from ethylene and the content of a monomer unit derived from at least one selected from the group consisting of propylene and α-olefins having the number of carbon atoms of 4 or more and 10 or less are calculated according to a method described in "Characterization of polyethylene by infrared absorption spectrum (Takayama, Usami et al.)" or "Die Makromolekulare Chemie, 177, 461 (1976) (Mc Rae, M. A., Madam S, W. F. et al.)".

When the component (A-1) has monomer units derived from other monomers in addition to the monomer unit derived from ethylene and the monomer unit derived from at least one selected from the group consisting of propylene and α-olefins having the number of carbon atoms of 4 or more and 10 or less, the content of the monomer units derived from other monomers is preferably 30% by weight or less, more preferably 20% by weight or less, with respect to 100% by weight of the whole amount of the component (A-1).

The content of the monomer units derived from other monomers can be determined by infrared spectroscopy. Specifically, using an infrared spectrophotometer, the peak intensity of a peak derived from the other monomer in the component (A-1) is measured and the content of the monomer unit derived from the other monomer in the component (A-1) is calculated from the peak intensity.

The component (A-1) includes an ethylene-propylene copolymer, an ethylene-1-butene copolymer, an ethylene-1-hexene copolymer, an ethylene-1-octene copolymer, an ethylene-propylene-1-butene copolymer, an ethylene-propylene-1-hexene copolymer, an ethylene-propylene-1-octene copolymer, an ethylene-propylene-5-ethylidene-2-norbornene copolymer, an ethylene-propylene-dicyclopentadiene copolymer, an ethylene-propylene-1,4-hexadiene copolymer and an ethylene-propylene-5-vinyl-2-norbornene copolymer. The component (A-1) is preferably an ethylene-propylene copolymer or an ethylene-propylene-5-ethylidene-2-norbornene copolymer. The component (A-1) may be used singly or in combination of two or more kinds thereof.

The Mooney viscosity ($ML_{1+4}$, 125° C.) of the component (A-1) measured at 125° C. is 50 or more. In order to maintain the antifungal performance of the thermoplastic elastomer composition for a longer period of time, reduce the compression permanent set and suppress the bleaching of the surface of the molded article containing the thermoplastic elastomer composition, the Mooney viscosity of the component (A-1) is preferably 60 or more, more preferably 70 or more, further preferably 80 or more, particularly preferably 90 or more. In order to improve the flowability of the thermoplastic elastomer composition, the Mooney viscosity of the component (A-1) is preferably 400 or less, more preferably 350 or less, further preferably 300 or less, particularly preferably 250 or less. The Mooney viscosity of the component (A-1) is preferably 50 or more and 400 or less, more preferably 60 or more and 400 or less, further preferably 70 or more and 350 or less, particularly preferably 90 or more and 250 or less.

The Mooney viscosity ($ML_{1+4}$, 125° C.) is measured according to JIS K6300. When the component (A-1) and a mineral oil (hereinafter, referred to as component (E) in some cases) are previously mixed, the Mooney viscosity ($ML_{1+4}$, 125° C.) of the component (A-1) can be calculated by the following formula (1).

$$\log(ML1/ML2)=0.0066(\Delta PHR) \quad (1)$$

ML1: Mooney viscosity of component (A-1)

ML2: Mooney viscosity of mixture of component (A-1) and component (E)

$\Delta$PHR: Content of component (E) with respect to 100 parts by weight of component (A-1)

The intrinsic viscosity of the component (A-1) measured in tetralin at 135° C. is preferably 1 dl/g or more, more preferably 2 dl/g or more, further preferably 4 dl/g or more, in order to maintain the antifungal performance of the thermoplastic elastomer composition for a longer period of time, reduce the compression permanent set and suppress the bleaching of the surface of the molded article containing the thermoplastic elastomer composition. The intrinsic viscosity of the component (A-1) is preferably 8 dl/g or less, more preferably 6 dl/g or less, further preferably 5.5 dl/g or less, in order to improve the flowability of the thermoplastic elastomer composition. The intrinsic viscosity of the component (A-1) is preferably 1 dl/g or more and 8 dl/g or less, more preferably 2 dl/g or more and 6 dl/g or less, further preferably 4 dl/g or more and 5.5 dl/g or less.

The intrinsic viscosity is a value obtained by measuring reduced viscosity in tetralin of 135° C. using a Ubbelohde type viscometer and treating the measured viscosity by an extrapolation method according to a calculation method described in "Polymer Solutions, Polymer Experimentology 11" (published by Kyoritsu Shuppan Co., Ltd. in 1982), p. 491.

The production method of the component (A-1) includes, for example, known polymerization methods such as a slurry polymerization method, a solution polymerization method, a bulk polymerization method, a gas phase polymerization method and the like using known complex type catalysts such as Ziegler-Natta type catalysts, metallocene type complexes; non-metallocene type complexes such as a post-Kaminsky catalyst; and the like.

The content of the component (A-2) contained in the thermoplastic elastomer composition is 5 parts by weight or more and 95 parts by weight or less, with respect to 100 parts by weight of the total amount of the component (A-2) and the component (B). The content of the component (A-2) is preferably 20 parts by weight or more, more preferably 35 parts by weight or more, further preferably 51 part by weight or more, in order to improve the flowability of the thermoplastic elastomer composition. The content of the component (A-2) is preferably 80 parts by weight or less, more preferably 75 parts by weight or less, further preferably 70 parts by weight or less, in order to maintain the antifungal performance of the thermoplastic elastomer composition for a longer period of time, reduce the compression permanent set and suppress the bleaching of the surface of the molded article containing the thermoplastic elastomer composition. The content of the component (A-2) is preferably 20 parts by weight or more and 80 parts by weight or less, more preferably 35 parts by weight or more and 75 parts by weight or less, further preferably 51 part by weight or more and 70 parts by weight or less.

The weight of the component (A-2) can be considered to be the same as the weight of the component (A-1) used as a raw material.

(Propylene Polymer (Component (B)))

The component (B) includes, for example, a propylene homopolymer, a propylene random copolymer and heterophasic polymerization materials. The component (B) may be used singly or in combination of two or more kinds thereof. The content of a monomer unit derived from propylene in the component (B) is over 50% by weight and 100% by weight or less, with respect to 100% by weight of the whole amount of the component (B).

The propylene random copolymer includes, for example, (1) a propylene-ethylene random copolymer in which the content of a monomer unit derived from propylene is 90% by weight or more and 99.5% by weight or less and the content of a monomer unit derived from ethylene is 0.5% by weight or more and 10% by weight or less, with respect to 100% by weight of the total amount of a monomer unit derived from propylene and a monomer unit derived from ethylene;

(2) a propylene-ethylene-$\alpha$-olefin random copolymer in which the content of a monomer unit derived from propylene is 81% by weight or more and 99% by weight or less, the content of a monomer unit derived from ethylene is 0.5% by weight or more and 9.5% by weight or less and the content of a monomer unit derived from an $\alpha$-olefin having the number of carbon atoms of 4 or more and 10 or less is 0.5% by weight or more and 9.5% by weight or less, with respect to 100% by weight of the total amount of a monomer unit derived from propylene, a monomer unit derived from ethylene and a monomer unit derived from an $\alpha$-olefin having the number of carbon atoms of 4 or more and 10 or less; or, (3) a propylene-α-olefin random copolymer in which the content of a monomer unit derived from propylene is 90% by weight or more and 99.5% by weight or less and the content of a monomer unit derived from an α-olefin having the number of carbon atoms of 4 or more and 10 or less is 0.5% by weight or more and 10% by weight or less, with respect to 100% by weight of the total amount of a monomer unit derived from propylene and a monomer unit derived from an α-olefin having the number of carbon atoms of 4 or more and 10 or less.

The α-olefin having the number of carbon atoms of 4 or more and 10 or less in the above-described (1) and (2) includes, for example, linear α-olefins such as 1-butene, 1-pentene, 1-hexene, 1-octene, 1-decene and the like; and brunched α-olefins such as 3-methyl-1-butene, 3-methyl-1-pentene and the like. The α-olefin having the number of carbon atoms of 4 or more and 10 or less may be used singly or in combination of two or more kinds thereof.

The method for producing a propylene homopolymer and a propylene random copolymer includes, for example, a slurry polymerization method, a solution polymerization method, a bulk polymerization method and a gas phase polymerization method using known complex type catalysts such as Ziegler-Natta catalysts, metallocene complexes, non-metallocene complexes and the like.

The heterophasic polymerization material is a polymerization material composed of a propylene homopolymer component (I) and an ethylene copolymer component (II) having a monomer unit derived from at least one selected from the group consisting of propylene and α-olefins having the number of carbon atoms of 4 or more and a monomer unit derived from ethylene. With respect to 100% by weight of the whole amount of the heterophasic polymerization material, the content of the propylene homopolymer component (I) in the heterophasic polymerization material is preferably 70% by weight or more and 90% by weight or less and the content of the ethylene copolymer component (II) in the heterophasic polymerization materials is preferably 10% by weight or more and 30% by weight or less. With respect to 100% by weight of the whole amount of the heterophasic polymerization materials, the content of the propylene homopolymer component (I) is more preferably 75% by weight or more and 90% by weight or less and the content of the ethylene copolymer component (II) is more preferably 10% by weight or more and 25% by weight or less.

The α-olefin having the number of carbon atoms of 4 or more in the ethylene copolymer component (II) is preferably an α-olefin having the number of carbon atoms of 4 or more and 20 or less. The α-olefin having the number of carbon atoms of 4 or more and 20 or less includes, for example, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene and 2,2,4-trimethyl-1-pentene. The α-olefin having the number of carbon atoms of 4 or more is more preferably an α-olefin having the number of carbon atoms of 4 or more and 10 or less, further preferably 1-butene, 1-hexene or 1-octene. The α-olefin having the number of carbon atoms of 4 or more may be used singly or in combination of two or more kinds thereof.

The content of a monomer unit derived from ethylene in the ethylene copolymer component (II) is preferably 22% by weight or more and 80% by weight or less, more preferably 25% by weight or more and 70% by weight or less, further preferably 27% by weight or more and 60% by weight or less, with respect to 100% by weight of the total amount of a monomer unit derived from at least one selected from the group consisting of propylene and α-olefins having the number of carbon atoms of 4 or more and a monomer unit derived from ethylene. The content of a monomer unit derived from at least one selected from the group consisting of propylene and α-olefins having the number of carbon atoms of 4 or more in the ethylene copolymer component (II) is preferably 20% by weight or more and 78% by weight or less, more preferably 30% by weight or more and 75% by weight or less, further preferably 40% by weight or more and 73% by weight or less, with respect to 100% by weight of the total amount of a monomer unit derived from at least one selected from the group consisting of propylene and α-olefins having the number of carbon atoms of 4 or more and a monomer unit derived from ethylene. The content of a monomer unit derived from ethylene and the content of a monomer unit derived from at least one selected from the group consisting of propylene and α-olefins having the number of carbon atoms of 4 or more can be determined by infrared spectroscopy. Specifically, the infrared absorption spectrum of the ethylene copolymer component (II) is measured using an infrared spectrophotometer, and the content of a unit derived from ethylene and the content of a monomer unit derived from at least one selected from the group consisting of propylene and α-olefins having the number of carbon atoms of 4 or more are calculated according to a method described in "Characterization of polyethylene by infrared absorption spectrum (Takayama, Usami et al.)" or "Die Makromolekulare Chemie, 177, 461 (1976) (Mc Rae, M. A., Madam S, W. F. et al.)".

The ethylene copolymer component (II) includes, for example, a propylene ethylene copolymer, an ethylene-1-butene copolymer, an ethylene-1-hexene copolymer, an ethylene-1-octene copolymer, a propyleneethylene-1-butene copolymer, a propyleneethylene-1-hexene copolymer and a propyleneethylene-1-octene copolymer, and is preferably a propylene ethylene copolymer or a propyleneethylene-1-butene copolymer. The ethylene copolymer component (II) may be a random copolymer or a block copolymer.

The production method of a heterophasic polymerization material includes a method of multistage polymerization using a polymerization catalyst.

The polymerization catalyst used for production of a heterophasic polymerization material includes, for example, Ziegler catalysts, Ziegler-Natta catalysts, catalysts composed of a transition metal compound of Group 4 of the periodic table having a cyclopentadienyl ring and an alkylaluminoxane, and catalysts composed of a transition metal compound of Group 4 of the periodic table having a cyclopentadienyl ring, a compound reacting with the transition metal compound to form an ionic complex and an organoaluminum compound.

Further, a prepolymerization catalyst may also be used in the presence of the above-described polymerization catalyst. The prepolymerization catalyst includes, for example, catalysts described in JP-A No. sho-61-218606, JP-A No. sho-61-287904, JP-A No. hei-5-194685, JP-A No. hei-7-216017, JP-A No. hei-9-316147, JP-A No. hei-10-212319 and JP-A No. 2004-182981.

The polymerization method in production of a heterophasic polymerization material includes, for example, bulk polymerization, solution polymerization, slurry polymerization and gas phase polymerization. The inert hydrocarbon solvent used in solution polymerization and slurry polymerization includes, for example, propane, butane, isobutane, pentane, hexane, heptane and octane. These polymerization methods may be used in combination of two or more kinds thereof, or may be either batch type or continuous type. The polymerization method in production of a heterophasic polymerization material is preferably continuous gas phase polymerization or bulk-gas phase polymerization in which bulk polymerization and gas phase polymerization are carried out continuously.

The melt flow rate (MFR) of the component (B) measured according to JIS K7210 at a temperature of 230° C. and a load of 21.18 N is preferably 20 g/10 min or less, more preferably 15 g/10 min or less, further preferably 10 g/10 min or less, in order to reduce the compression permanent set of the thermoplastic elastomer composition. MFR of the component (B) is preferably 0.05 g/10 min or more, more preferably 0.1 g/10 min or more. MFR of the component (B) is preferably 0.05 g/10 min or more and 20 g/10 min or less, more preferably 0.1 g/10 min or more and 15 g/10 min or less, further preferably 0.1 g/10 min or less and 5 g/10 min or less.

When two or more components (B) are combined, the melt flow rate of the propylene polymer having the highest content is taken as the melt flow rate of the component (B).

The component (B) is preferably a propylene homopolymer, a propylene ethylene random copolymer, a propylene ethylenebutene random copolymer or a heterophasic polymerization materials, more preferably a propylene homopolymer, an ethylene-propylene random copolymer or a heterophasic polymerization material.

The content of the component (B) contained in the thermoplastic elastomer composition is 5 parts by weight or more and 95 parts by weight or less, with respect to 100 parts by weight of the total amount of the component (A-2) and the component (B). The lower limit of the content of the component (B) contained in the thermoplastic elastomer composition is preferably 20 parts by weight or more, more preferably 25 parts by weight or more, further preferably 30 parts by weight or more, in order to maintain the antifungal performance of the thermoplastic elastomer composition for a longer period of time, reduce the compression permanent set and suppress the bleaching of the surface of the molded article containing the thermoplastic elastomer composition. The content of the component (B) contained in the thermoplastic elastomer composition is preferably 80 parts by weight or less, more preferably 65 parts by weight or less, further preferably 49 parts by weight or less, in order to improve the flowability of the thermoplastic elastomer composition. The content of the component (B) contained in the thermoplastic elastomer composition is preferably 20 parts by weight or more and 80 parts by weight or less, more preferably 25 parts by weight or more and 65 parts by weight or less, further preferably 30 parts by weight or more and 49 parts by weight or less.

The ratio of the content of the component (A-2) to the content of the component (B) (component (A-2)/component (B)) is preferably 0.5 or more, more preferably 1.0 or more, further preferably 1.5 or more, in order to maintain the antifungal performance of the thermoplastic elastomer composition for a longer period of time, reduce the compression permanent set and suppress the bleaching of the surface of the molded article containing the thermoplastic elastomer composition. The ratio of the content of the component (A-2) to the content of the component (B) is preferably 4.0 or less, more preferably 3.0 or less, further preferably 2.3 or less, in order to improve the flowability of the thermoplastic elastomer composition. The ratio of the content of the component (A-2) to the content of the component (B) is preferably 0.5 or more and 4.0 or less, more preferably 1.0 or more and 3.0 or less, further preferably 1.5 or more and 2.3 or less.

The sum of the content of the component (A-2) and the content of the component (B) is preferably 47% by weight or more, more preferably 57% by weight or more, with respect to 100% by weight of the whole amount of the thermoplastic elastomer composition. The sum of the content of the component (A-2) and the content of the component (B) is preferably 99.995% by weight or less, more preferably 99.975% by weight or less, with respect to 100% by weight of the whole amount of the thermoplastic elastomer composition.

(Antifungal Agent (Component (C)))

The antifungal agent is a compound which prevents the breeding of a mold which is one of fungus.

The antifungal agent (C) (hereinafter, referred to as component (C) in some cases) includes, for example, an organic nitrogen sulfur compound and a boron-based compound.

The synthetic antifungal agent includes, for example, an imidazole type compound, a phthalimide type compound, a sulfamide type compound, a nitrile type compound, a benzothiazole type compound, a thiocyanate type compound, a thiocyanate type compound, an orthophenylphenol (OPP) type compound, a phenylpyrrole type compound, an anilinopyrimidine type compound, a methoxy acrylate type compound and a halogenated phenol type compound.

The imidazole type compound includes, for example, thiabendazole, methyl-2-benzimidazole carbamate, methyl-1-(butylcarbamoyl)benzimidazole-2-carbamate and enilconazole.

The phthalimide type compound includes, for example, N-(trichloromethylthio)phthalimide.

The sulfamide type compound includes, for example, N-nitrosocyclohexylhydrooxylaminealuminum.

The nitrile type compound includes, for example, 2,4,5,6-tetrachlorisophthalonitrile.

The benzothiazole type compound includes, for example, 2-(thiocyanomethylthio)benzothiazole.

The thiocyanate type compound includes, for example, methylenebisthiocyanate.

The orthophenylphenol type compound includes, for example, an orthophenylphenol sodium salt.

The phenylpyrrole type compound includes, for example, fludioxonil.

The anilinopyrimidine type compound includes, for example, pyrimethanil.

The methoxy acrylate type compound includes, for example, azoxystrobin.

The halogenated phenol type compound includes, for example, p-chlorometaxylenol (P CMX).

The natural antifungal agent includes, for example, hinokitylenol, thymol and d-limonene.

The component (C) may be used singly or in combination of two or more kinds thereof. The component (C) is preferably an organic nitrogen sulfur compound, more preferably an imidazole type compound, further preferably thiabendazole.

The commercially available product of the synthetic antifungal agent includes, for example, "NEOSINTOL (registered trademark) P", "NEOSINTOL (registered trademark) P-20", "NEOSINTOL (registered trademark) EP", "NEOSINTOL (registered trademark) AF-40", "NEOSINTOL (registered trademark) AF-50", "NEOSINTOL (registered trademark) AF-60", "NEOSINTOL (registered trademark) AF-75", "NEOSINTOL (registered trademark) AF-80", "NEOSINTOL (registered trademark) AF-160", "NEOSIN- TOL (registered trademark) AF-690L", "NEOSINTOL (registered trademark) AF-730", "NEOSINTOL (registered trademark) AF-810", "NEOSINTOL (registered trademark) AF-931", VSINTOL M-20", VSINTOL M-30", VSINTOL M-100", "NEOSINTOL (registered trademark) WP-10", "NEOSINTOL (registered trademark) WP-200", "BIOMESSENGER (registered trademark) R-2", "BIOMESSENGER (registered trademark) R-9", "SINTOL OT" and "FK-C" manufactured by SC Environmental Science Co., Ltd., "PacificBeam (registered trademark)" manufactured by M.I.C. Co., Ltd., "Bactekiller (registered trademark)" manufactured by Fuji Chemical Industries, Ltd. and "San-ai zol" manufactured by SAN-AI Oil Co., Ltd.

With respect to 100% by weight of the whole amount of the thermoplastic elastomer composition, the content of the compound (C) in the thermoplastic elastomer composition is 0.005% by weight or more, preferably 0.008% by weight or more, more preferably 0.01% by weight or more, further preferably 0.05% by weight or more, particularly preferably 0.1% by weight or more in order to maintain the antifungal performance of the thermoplastic elastomer composition for a longer period of time, and is 3% by weight or less, more preferably 1% by weight or less, further preferably 0.7% by weight or less, still further preferably 0.5% by weight or less, particularly preferably 0.2% by weight or less in order to suppress bleaching of the surface of the molded article containing the thermoplastic elastomer composition. The content of the compound (C) in the thermoplastic elastomer composition is 0.005% by weight or more and 3% by weight or less, preferably 0.008% by weight or more and 1% by weight or less, more preferably 0.01% by weight or more and 0.7% by weight or less, further preferably 0.05% by weight or more and 0.5% by weight or less, particularly preferably 0.1% by weight or more and 0.2% by weight or less, with respect to 100% by weight of the whole amount of the thermoplastic elastomer composition.

(Mineral Oil (Component (E))

The thermoplastic elastomer composition of the present invention may also contain a mineral oil (hereinafter, referred to as component (E) in some cases), in addition to the component (A-2), the component (B) and the component (C).

The component (E) is a high-boiling fraction of petroleum. The component (E) includes, for example, aromatic mineral oils, naphthenic mineral oils and paraffinic mineral oils. The component (E) is preferably a paraffinic mineral oil. The component (E) is preferably one having an average molecular weight of 300 or more and 1500 or less, and a flow point of 0° C. or less.

With respect to 100 parts by weight of the total amount of the component (A-2) and the component (B), the content of the component (E) in the thermoplastic elastomer composition is preferably 1 part by weight or more, more preferably 30 parts by weight or more, in order to improve the flowability of the thermoplastic elastomer composition, and is preferably 100 parts by weight or less, more preferably 60 parts by weight or less, in order to suppress bleeding of the mineral oil. The content of the component (E) in the thermoplastic elastomer composition is preferably 1 part by weight or more and 100 parts by weight or less, more preferably 30 parts by weight or more and 60 parts by weight or less, with respect to 100 parts by weight of the total amount of the component (A-2) and the component (B).

The thermoplastic elastomer composition of the present invention may also contain other additives and other thermoplastic resins, in addition to the above-described components (A-1) to (E).

The other additives include, for example, an inorganic filler, an organic filler, an antioxidant, an ultraviolet absorber, a thermal stabilizer, a light stabilizer, an antistatic agent, a nucleating agent, a pigment, an adsorbent, a metal chloride, a lubricant, a silicone compound, an antimicrobial agent, an antiviral agent, a mildew-proofing agent and an anti-algae agent. In the present specification, the antimicrobial agent is a compound different from the component (C) and is a compound that prevents breeding of bacteria such as *Escherichia coli, Staphylococcus aureus* and the like.

The inorganic filler includes, for example, talc, calcium carbonate and calcined kaolin.

The organic filler includes, for example, fiber, wood flour and cellulose powder.

The antioxidant includes, for example, phenol type antioxidants, sulfur-based antioxidants, phosphorus-based antioxidants, lactone type antioxidants and vitamin type antioxidants.

The ultraviolet absorber includes, for example, benzotriazole type ultraviolet absorbers, triazine type ultraviolet absorbers, anilide type ultraviolet absorbers and benzophenone type ultraviolet absorbers.

The light stabilizer includes, for example, hindered amine type light stabilizers and benzoate type light stabilizers.

The metal chloride includes, for example, iron chloride and calcium chloride.

The lubricant includes, for example, fatty acids, higher alcohols, aliphatic amides and aliphatic esters.

The other thermoplastic resins include ethylene polymers in which the content of a monomer unit derived from ethylene is over 95% by weight and 100% by weight or less, with respect to 100% by weight of the whole amount of the ethylene copolymer, and the like.

The ethylene polymer in which the content of a monomer unit derived from ethylene is over 95% by weight and 100% by weight or less includes, for example, an ethylene homopolymer, and a copolymer comprising a monomer unit derived from ethylene and a monomer unit derived from at least one selected from the group consisting of propylene and α-olefins having the number of carbon atoms of 4 or more 10 or less.

The content of other thermoplastic resins is preferably 40 parts by weight or less, with respect to 100 parts by weight of the total amount of the component (A-2) and the component (B).

The compression permanent set of the thermoplastic elastomer composition measured under the following conditions is preferably 80% or less, more preferably 70% or less, further preferably 60% or less, particularly preferably 55% or less.

Measurement conditions of compression permanent set: the compression permanent set of a fabricated molded article under the following conditions is measured according to JIS K6262 at a test temperature of 70° C., a test time of 22 hours and a compression ratio of 25%.

Fabrication conditions of molded article: the thermoplastic elastomer composition is hot press-molded at a temperature of 200° C. and a maximum pressure of 10 MPa for 3 minutes, then, cold press-molded at a temperature of 23° C. and a maximum pressure of 10 MPa for 5 minutes, to fabricate a molded article When a load is applied to the molded article made of the composition and thereafter the load is removed, the deformation of the molded article is not small, so the compression permanent set of the thermoplastic elastomer composition is preferably as small as possible.

The compression permanent set of the thermoplastic elastomer composition can be appropriately set to a preferable range by adjusting the content of the component (A-2), the melt flow rate of the component (B) and the Mooney viscosity of the component (A-1) measured at 125° C.

(Production Method of Thermoplastic Elastomer Composition)

The method for producing the thermoplastic elastomer composition of the present invention includes (i) a method containing a step (1-1) of melt-kneading a component (A-1), a component (B), a component (C) and a component (D), and (ii) a method containing a step (1-2) of melt-kneading a component (A-1), a component (B) and a component (D) to obtain a composition precursor and a step (2-2) of melt-kneading the above-described composition precursor and a component (C).

In the above-described step (1-1), the content of the component (A-1) is 5 parts by weight or more and 95 parts by weight or less and the content of the component (B) is 5 parts by weight or more and 95 parts by weight or less, with respect to 100 parts by weight of the total amount of the component (A-1) and the component (B), and the content of the component (C) is 0.005% by weight or more and 3% by weight or less, with respect to 100% by weight of the whole amount of the resultant thermoplastic elastomer composition.

With respect to 100 parts by weight of the total amount of the component (A-1) and the component (B), the content of the component (A-1) is preferably 20 parts by weight or more and 80 parts by weight or less, more preferably 35 parts by weight or more and 75 parts by weight or less, further preferably 51 part by weight or more and 70 parts by weight or less. The content of the component (C) is preferably 0.008% by weight or more and 1% by weight or less, more preferably 0.01% by weight or more and 0.7% by weight or less, further preferably 0.05% by weight or more and 0.5% by weight or less, particularly preferably 0.1% by weight or more and 0.2% by weight or less, with respect to 100% by weight of the whole amount of the thermoplastic elastomer composition.

In the above-described step (1-2), the content of the component (A-1) is 5 parts by weight or more and 95 parts by weight or less and the content of the component (B) is 5 parts by weight or more and 95 parts by weight or less, with respect to 100 parts by weight of the total amount of the component (A-1) and the component (B).

The content of the component (A-1) is preferably 20 parts by weight or more and 80 parts by weight or less, more preferably 35 parts by weight or more and 75 parts by weight or less, further preferably 51 part by weight or more and 70 parts by weight or less, with respect to 100 parts by weight of the total amount of the component (A-1) and the component (B).

In the above-described step (2-2), the content of the component (C) is 0.005% by weight or more and 3% by weight or less, preferably 0.008% by weight or more and 1% by weight or less, more preferably 0.01% by weight or more and 0.7% by weight or less, further preferably 0.05% by weight or more and 0.5% by weight or less, particularly preferably 0.1% by weight or more and 0.2% by weight or less, with respect to 100% by weight of the whole amount of the resultant thermoplastic elastomer composition.

The melt-kneading apparatus includes an open type mixing roll, a non-open type Banbury mixer, an extruder, a kneader, a continuous mixer and the like, and is preferably a non-open type apparatus. In addition, all components to be melt-kneaded all at once, or after kneading a part of the components, the remaining components may be added and melt-kneaded, and the components may be melt-kneaded once or more times. The temperature in melt-kneading is preferably 150° C. or more and 250° C. or less, and the time thereof is preferably 30 seconds or more and 30 minutes or less. The components to be kneaded may be added in any order and may be added at the same time.

For the component (C), a master batch containing the component (C) and a thermoplastic resin may be previously prepared and added to the above-described step (1-1) or the above-described step (2-2). The production method of a master batch containing the component (C) and a thermoplastic resin includes, for example, a method of melt-kneading the component (C) and a thermoplastic resin using the above-described melt-kneading apparatus. The melt-kneading temperature in producing a master batch is usually 100° C. or more and 300° C. or less.

The thermoplastic resin contained in the above-described master batch includes, for example, polyolefin resins such as the above-described component (B), a high density polyethylene, a low density polyethylene, a linear low density polyethylene, polybutene, poly-3-methylpentene, an ethylene-propylene copolymer, an ethylene-vinyl acetate copolymer and the like.

The content of the component (C) contained in the above-described master batch is usually 10% by weight or more and 95% by weight or less, preferably 20% by weight or more and 90% by weight or less, with respect to 100% by weight of the whole amount of the master batch.

The component (E), other additives and other thermoplastic resins may be previously compounded in the component (A-1), the component (B) or both the components. The component (E), other additives and other thermoplastic resins may be melt-kneaded together with the component (A-1), the component (B), the component (C) and the component (D) in the above-described step (1-1), or may be melt-kneaded together with the composition obtained in the above-described step (1-1) after the step (1-1). The component (E), other additives and other thermoplastic resins may be melt-kneaded together with the component (A-1), the component (B) and the component (D) in the above-described step (1-2), may be melt-kneaded together with the composition precursor and the component (C) in the above-described step (2-2), or melt-kneaded together with the composition obtained in the above-described step (2-2) after the step (2-2).

The above-described component (E) may be previously mixed with the component (A-1). The method of mixing the component (A-1) and the component (E) includes, for example, a method of mechanically kneading the component (A-1) and the component (E) using a kneading apparatus such as a roll, a Banbury mixer and the like, a method of adding a prescribed amount of the component (E) to a solution of the component (A-1) to obtain a mixed solution, then, removing the solvent from the mixed solution by a method such as a spray drying method, a steam stripping method, a supercritical drying method using carbon dioxide or the like, a method of adding an oil directly to a rubber in the form of latex and stirring the mixture, then, solidifying the rubber, and other methods.

(Crosslinking Agent (Component (D)))

The component (D) includes, for example, organic peroxides, sulfur compounds and alkylphenol resins. The component (D) is preferably an organic peroxide.

The organic peroxide includes, for example, ketone peroxides, diacyl peroxides, hydroperoxides, dialkyl peroxides, peroxyketals, alkyl peresters, percarbonates, peroxydicarbonates and peroxy esters.

The organic peroxide includes specifically dicumyl peroxide, 2,5-dimethyl-2,5-di(t-butylperoxy)hexane, 2,5-dimethyl-2,5-di(t-butylperoxy)hexyne, 1,3-bis(t-butylperoxyisopropyl)benzene, t-butyl cumyl peroxide, di-t-butyl peroxide, 2,2,4-trimethylpentyl-2-hydroperoxide, diisopropylbenzene hydroperoxide, cumene peroxide, t-butyl peroxide, 1,1-di(t-butylperoxy)3,5,5-trimethylcyclohexane, 1,1-di-t-butylperoxycylohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, p-chlorobenzoyl peroxide. The organic peroxide may be used singly or in combination of two or more kinds thereof.

The component (D) may also be combined with a crosslinking assistant, in order to increase the degree of crosslink of the above-described component (A-2). The crosslinking assistant is preferably a compound having two or more double bonds. The crosslinking assistant includes, for example, peroxide crosslinking assistants such as N,N-m-phenylenebismaleimide, toluylene bismaleimide, p-quinone dioxime, nitrosobenzene, diphenylguanidine, trimethylolpropane and the like; divinylbenzene, triallyl cyanurate, triallyl isocyanurate, ethylene glycol dimethacrylate, polyethylene glycol dimethacrylate, trimethylolpropane trimethacrylate and allyl methacrylate, and is preferably trimethylolpropane trimethacrylate.

In each of the above-described step (1-1) and the above-described step (1-2), the compounding amount of the component (D) is preferably 0.01 part by weight or more and 10 parts by weight or less, more preferably 0.1 part by weight or more and 5 parts by weight or less, further preferably 0.2 parts by weight or more and 3 parts by weight or less, with respect to 100 parts by weight of the total amount of the component (A-1) and the component (B).

When a crosslinking assistant is used together with the component (D), the content of the crosslinking assistant is preferably 0.01 part by weight or more and 10 parts by weight or less, more preferably 0.1 part by weight or more and 2 parts by weight or less, with respect to 100 parts by weight of the total amount of the component (A-1) and the component (B).

The thermoplastic elastomer composition of the present invention can be, for example, molded by a known molding method such as extrusion molding, calendar molding, injection molding and the like using a usual apparatus used for molding of a thermoplastic resin, to obtain a molded article containing the thermoplastic elastomer composition.

The molded article containing the thermoplastic elastomer composition contains the component (C) in an amount of preferably 30% by weight or more, more preferably 50% by weight or more, with respect to 100% by weight of the content of the component (C) contained in the thermoplastic elastomer composition used as the raw material of the molded article, after about one-equivalent year. The molded article containing the thermoplastic elastomer composition contains the component (C) in an amount of 20% by weight or more, with respect to 100% by weight of the content of the component (C) contained in the thermoplastic elastomer composition used as the raw material of the molded article, after about five-equivalent years.

The molded article containing the thermoplastic elastomer composition can be used, for example, in bathroom and bathtub parts, rubber-related parts, automobile parts, electrical parts, household electronic parts, furniture members, construction members, footwear parts, sports utensil parts, medical and nursing care products, and other industrial materials.

The bathroom and bathtub parts include sinks, bathroom joints, packing rubbers, handrails, duckboards, shower hoses and bathtub lids.

The rubber-related parts include, for example, a damper, a hose, a joint, a rack, a tube, a gasket and a sealing material.

The automobile parts include, for example, interior materials of vehicles and the like, sheets, timing belts, wiper blades, glass run channels, weather strips, car air conditioners, wind washer tubes, emission control hoses, fuel hoses, power steering hoses, brake hoses, clutch hoses and master pack hoses.

The electrical parts include a conveyor belt, a camera, a copying machine, a sewing machine, a BS antenna, a VTR cover, a computer, a keyboard, a button, a register, a printer, a stepping motor, a magnetic disk and a hard disk drive.

The household electronic parts include, for example, a fan heater, an air conditioner, an air conditioner hose, a washing machine hose for dry cleaning, a drain pan, a vacuum cleaner, an air purifier, a fan, a ventilator, a washing machine, a dryer, a dishwasher, a refrigerator and a mobile phone.

The furniture members include interior decorative materials such as a curtain, a wall covering, a floor material, a ceiling material and the like, and cotton pads of cushions and mattresses.

The construction members include, for example, a housing, a cabinet, a roof, a floor, a shutter, a curtain rail, a floor plate, a pipe duct, an earthquake resistant ring, a deck plate, a curtain wall, a duct, a stairway, a door, a seismic isolator, a ceiling portion of a bay window sash, housing foundation and a wall material.

The footwear parts include an insole and an outsole of shoes, a shoe sole, a midsole, an inner sole and a sole.

The sports utensil parts include, for example, a racket, a grip material (a golf club, a tennis racket, a bicycle, etc.), a string of a racket, an armor and a ball.

The medical and nursing care products include, for example, a carrying tool, a helmet, a glove, a guard, bedclothes, linen, a partition, a hearing aid, an ultrasound imaging diagnostic apparatus, various medical pumps and MRI.

The other industrial materials include, for example, an anti-tip sheet, a pallet, an adhesive tape, a packaging film for transportation, a plant piping, a pipe, a grip material and a toy.

EXAMPLES (Method for Measuring Physical Properties)
[Mooney Viscosity ($ML_{1+4}$, 125° C.)]

Mooney viscosity was measured according to JIS K6300. When the component (A-1) and the component (E) are previously mixed, the Mooney viscosity ($ML_{1+4}$, 125° C.) of the component (A-1) was calculated by the following formula (1).

$$\log(ML1/ML2) = 0.0066(\Delta PHR) \qquad (1)$$

ML1: Mooney viscosity of component (A-1)
ML2: Mooney viscosity of a mixture of component (A-1) and component (E)
ΔPHR: Content of component (E) with respect to 100 parts by weight of component (A-1)

[Content (Unit: % by Weight) of Monomer Unit Derived from Ethylene, Monomer Unit Derived from Propylene and Monomer Unit Derived from 5-Ethylidene-2-Norbornene]

The measurement was carried out by infrared spectroscopy. Specifically, the content was measured by the following method. An ethylene-propylene-5-ethylidene-2-norbornene copolymer was molded into a film having a thickness of about 0.5 mm. Using an infrared spectrophotometer, the peak (absorption peak at 1688 cm$^{-1}$) intensity derived from 5-ethylidene-2-norbornene of the resultant film was measured, and the content of the monomer derived from 5-ethylidene-2-norbornene in the copolymer was calculated. Next, an ethylene-propylene-5-ethylidene-2-norbornene copolymer was newly molded into a film having a thickness of about 0.1 mm. Using an infrared spectrophotometer, the infrared absorption spectrum of the resultant film was measured, and the content of a monomer unit derived from ethylene and the content of a monomer unit derived from propylene were calculated according to a method described in literatures: "Characterization of polyethylene by infrared absorption spectrum (Takayama, Usami et al.)" or "Die Makromolekulare Chemie, 177, 461 (1976) (Mc Rae, M. A., Madam S, W. F. et al.)".

[Accelerated Test]

Based on the Arrhenius's law described in "Barrow Physical Chemistry 5-th" (Tokyo Kagaku Dojin, 1990), conditions to make the passage of about one-equivalent year or about five-equivalent years were decided. A molded article was allowed to stand still in an oven of 90° C. for 4 days, and aged for about one-equivalent year at a standard temperature of 23° C., to fabricate an about one-equivalent year-aged product. The resultant molded article was allowed to stand still in an oven of 90° C. for 18 days, and aged for about five-equivalent years at a standard temperature of 23° C., to fabricate an about five-equivalent years-aged product.

[Fungus Resistance]

The about one-equivalent year-aged product and the about five-equivalent years-aged product were washed with 10 mL of ethanol by stirring for 2 minutes, respectively, then, subjected to a fungus resistance test according to Method B described in JIS Z2911, and evaluated at the following 6 stages after 7 days from the start of the test.

0: Growth of fungi is not recognized with the naked eyes and under a microscope

1: Growth of fungi is not recognized with the naked eyes, but it is clearly recognized under a microscope.

2: Growth of fungi is recognized with the naked eyes, and the area of the growth part is less than 25% of the total area of the sample 3: Growth of fungi is recognized with the naked eyes, and the area of the growth part is 25% or more and less than 50% of the total area of the sample 4: Mycelia grow well, and the area of the growth part is 50% or more of the total area of the sample 5: Growth of mycelia is remarkable, covering the entire sample

[Bleaching of Surface of Molded Article]

The presence or absence of bleaching of the surface of the about one-equivalent year-aged product was visually observed, and evaluated at the following three stages.

1: Bleaching of surface of molded article is not recognized

2: Bleaching of surface of molded article is slightly recognized

3: Bleaching of surface of molded article is remarkable

[Compression Permanent Set]

The compression permanent set of the molded article was measured according to JIS K6262 at a test temperature of 70° C., a test time of 22 hours and a compression rate of 25%.

The materials used in examples are as described below.

Component (A-1): Ethylene-α-Olefin Copolymer ((A-1)1+E1): Mixture of 100 parts by weight of (((A-1)1) ethylene-propylene-5-ethylidene-2-norbornene copolymer, trade name: "Esprene (registered trademark) 670F", manufactured by Sumitomo Chemical Co., Ltd. and 100 parts by weight of paraffinic mineral oil (E1)

The Mooney viscosity (ML$_{1+4}$, 125° C.) of ((A-1)1) calculated by the above-described formula (1)=210, the content of a monomer unit derived from ethylene of ((A-1)1)=66% by weight, the content of a monomer unit derived from propylene of ((A-1)1)=30% by weight and the content of a monomer unit derived from 5-ethylidene-2-norbornene of ((A-1)1)=4% by weight ((A-1)2): ethylene-propylene-5-ethylidene-2-norbornene copolymer, manufactured by Sumitomo Chemical Co., Ltd., trade name: "Esprene (registered trademark) 512F"

The Mooney viscosity (ML$_{1+4}$, 125° C.) of ((A-1)2)=62, the content of a monomer unit derived from ethylene of ((A-1)2)=65% by weight, the content of a monomer unit derived from propylene of ((A-1)2)=31% by weight and the content of a monomer unit derived from 5-ethylidene-2-norbornene of ((A-1)2)=4% by weight ((A-1)3): ethylene-propylene-5-ethylidene-2-norbornene copolymer, manufactured by Sumitomo Chemical Co., Ltd., trade name: "Esprene (registered trademark) 524"

The Mooney viscosity (ML$_{1+4}$, 125° C.) of ((A-1)3)=25, the content of a monomer unit derived from ethylene of ((A-1)3)=63% by weight, the content of a monomer unit derived from propylene of ((A-1)3)=32% by weight and the content of a monomer unit derived from 5-ethylidene-2-norbornene of ((A-1)3)=5% by weight ((A-1)4): ethylene-propylene-5-ethylidene-2-norbornene copolymer, Nordel™ IP 3745P manufactured by Dow Chemical Company The Mooney viscosity (ML$_{1+4}$, 125° C.) of ((A-1)4)=45, the content of a monomer unit derived from ethylene of ((A-1)4)=70% by weight, the content of a monomer unit derived from propylene of ((A-1)4)=29.5% by weight and the content of a monomer unit derived from 5-ethylidene-2-norbornene of ((A-1)4)=0.5% by weight Component (B): Propylene Polymer (B1): propylene homopolymer manufactured by Sumitomo Chemical Co., Ltd., trade name: "Norbrene (registered trademark) D101"

MFR (230° C., 21.18 N)=0.5 g/10 min (B2): propylene homopolymer manufactured by Sumitomo Chemical Co., Ltd., trade name: "Norbrene (registered trademark) Y501N"

MFR (230° C., 21.18 N)=15 g/10 min (B3): propylene homopolymer manufactured by Sumitomo Chemical Co., Ltd., trade name: "Norbrene (registered trademark) U501E1"

MFR (230° C., 21.18 N)=100 g/10 min

Component (C): Antifungal Agent (C1): thiabendazole (manufactured by SC Environmental Science Co., Ltd., trade name: "Synthol M-100")

(C2): organic nitrogen sulfur compound (manufactured by SC Environmental Science Co., Ltd., trade name: "FK-C")

Component (D): Crosslinking Agent (D1): manufactured by Kayaku Akzo Corporation trade name: "APO-10DL" (obtained by diluting 2,5-dimethyl-2, 5-di(t-butylperoxy)hexane with a paraffinic mineral oil (manufactured by Idemitsu Kosan Co., Ltd. trade name: "PW-100") to 10%)

Component (E): Mineral Oil (E1): paraffinic mineral oil manufactured by Idemitsu Kosan Co., Ltd. trade name: "PW-380"

(F1): antioxidant, trade name: "IRGANOX (registered trademark) 1010" manufactured by BASF Japan (F2): antioxidant manufactured by Sumitomo Chemical Co., Ltd., trade name: "SUMILIZER (registered trademark) GA80"

(G1): crosslinking assistant: trade name: "Hi-Cross MS50" (obtained by diluting trimethylolpropane trimethacrylate with silicon oxide to 50%) manufactured by Seiko Chemical Co., Ltd.

Example 1

((A-1)1+E1) (80 parts by weight), (B1) (20 parts by weight), (C1) (0.01 part by weight), (D1) (2.8 parts by weight), (G1) (0.4 parts by weight) and (F1) (0.09 parts by weight) were melt-kneaded in 100 cc LABO PLASTOMILL (manufactured by Toyo Seiki Seisaku-sho Ltd.) under conditions of a rotor temperature of 190±10° C., a rotation rate of 80 rpm and a kneading time of 13 minutes, to obtain a thermoplastic elastomer composition. The compounding amounts of components used as raw materials are shown in Table 1.

The resultant thermoplastic elastomer composition was cold press-molded by a compression molding machine (model F-37 manufactured by SHINTO Metal Industries Corporation) at a temperature of 200° C. and a maximum pressure of 10 MPa for 5 minutes, to fabricate three molded bodies having a length of 150 mm, a width of 150 mm and a thickness of 2 mm. One of the molded bodies was subjected to measurement of compression permanent set without performing an accelerated test. Another of the molded bodies was subjected to an accelerated test of about one-equivalent year, to obtain an about one-equivalent year-aged product. The other one of the molded bodies was subjected to an accelerated test of about five-equivalent years, to obtain an about five-equivalent years-aged product. The degree of bleaching of the surface of the about one-equivalent year-aged product was evaluated. The about one-equivalent year-aged product and the about five-equivalent years-aged product were subjected to a fungus resistance test. The results are shown in Table 1.

Example 2

A thermoplastic elastomer composition and a molded article were fabricated and evaluated in the same manner as in Example 1 except that ((A-1)2) (56 parts by weight), (B1) (5 parts by weight), (B2) (39 parts by weight), (C1) (0.01 part by weight), (D1) (2.7 parts by weight), (G1) (0.4 parts by weight) and (F2) (0.1 part by weight) were used as raw materials. The results are shown in Table 1.

Example 3

A thermoplastic elastomer composition and a molded article were fabricated and evaluated in the same manner as in Example 1 except that (C1) was used in an amount of 0.2 parts by weight. The results are shown in Table 1.

Example 4

A thermoplastic elastomer composition and a molded article were fabricated and evaluated in the same manner as in Example 2 except that (C1) was used in an amount of 0.2 parts by weight. The results are shown in Table 1.

Example 5

A thermoplastic elastomer composition and a molded article were fabricated and evaluated in the same manner as in Example 1 except that 20 parts by weight of (B3) and 0.2 parts by weight of (C1) were used instead of 20 parts by weight of (B1) and 0.01 part by weight of (C1) in Example 1. The results are shown in Table 1.

Example 6

A thermoplastic elastomer composition and a molded article were fabricated and evaluated in the same manner as in Example 1 except that 0.2 parts by weight of (C2) was used instead of 0.01 part by weight of (C1) in Example 1. The results are shown in Table 1.

Comparative Example 1

A thermoplastic elastomer composition and a molded article were fabricated and evaluated in the same manner as in Example 1 except that 56 parts by weight of ((A-1)3), 44 parts by weight of (B3), 0.01 part by weight of (C1), 2.7 parts by weight of (D1), 0.4 parts by weight of (G1) and 0.1 part by weight of (F2) were used as raw materials. The results are shown in Table 2.

Comparative Example 2

A thermoplastic elastomer composition and a molded article were fabricated and evaluated in the same manner as in Comparative Example 1 except that (C1) was used in an amount of 0.2 parts by weight. The results are shown in Table 2.

Comparative Example 3

A thermoplastic elastomer composition and a molded article were fabricated and evaluated in the same manner as in Example 1 except that 40 parts by weight of ((A-1)4), 20 parts by weight of (B1), 0.01 part by weight of (C1), 2.8 parts by weight of (D1), 40 parts by weight of (E1), 0.4 parts by weight of (G1) and 0.09 parts by weight of (F1) were used as raw materials. The results are shown in Table 2.

Comparative Example 4

A thermoplastic elastomer composition and a molded article were fabricated and evaluated in the same manner as in Comparative Example 3 except that 40 parts by weight of ((A-1)3) and 0.2 parts by weight of (C1) were used instead of 40 parts by weight of ((A-1)4) and 0.01 part by weight of (C1) in Comparative Example 3. The results are shown in Table 2.

TABLE 1

| production of thermoplastic elastomer | Example 1 | Example 2 | Example 3 | Example 4 | Example 5 | Example 6 |
|---|---|---|---|---|---|---|
| (A-1) 1 | 40 | | 40 | | 40 | 40 |
| (E1) | 40 | | 40 | | 40 | 40 |
| (A-1) 2 | | 56 | | 56 | | |
| (A-1) 3 | | | | | | |
| (A-1) 4 | | | | | | |
| (B1) | 20 | 5 | 20 | 5 | | 20 |
| (B2) | | 39 | | 39 | | |
| (B3) | | | | | 20 | |
| (C1) | 0.01 | 0.01 | 0.2 | 0.2 | 0.2 | |
| (C2) | | | | | | 0.2 |
| (D1) | 2.8 | 2.7 | 2.8 | 2.7 | 2.8 | 2.8 |
| (G1) | 0.4 | 0.4 | 0.4 | 0.4 | 0.4 | 0.4 |
| (F1) | 0.09 | | 0.09 | | 0.09 | 0.09 |
| (F2) | | 0.1 | | 0.1 | | |
| fungus resistance (after about one-equivalent year) | 0 | 1 | 0 | 0 | 0 | 1 |
| fungus resistance (after about five-equivalent years) | 1 | 2 | 0 | 0 | 0 | 1 |
| bleaching (after about one-equivalent year) | 1 | 1 | 1 | 2 | 2 | 1 |
| compression permanent set (%) | 53 | 69 | 53 | 69 | 56 | 60 |

TABLE 2

| production of thermoplastic elastomer | Comparative Example 1 | Comparative Example 2 | Comparative Example 3 | Comparative Example 4 |
|---|---|---|---|---|
| (A-1)1 | | | | |
| (E1) | | | 40 | 40 |
| (A-1)2 | | | | |
| (A-1)3 | 56 | 56 | | 40 |
| (A-1)4 | | | 40 | |
| (B1) | | | 20 | 20 |
| (B2) | | | | |
| (B3) | 44 | 44 | | |
| (C1) | 0.01 | 0.2 | 0.01 | 0.2 |
| (D1) | 2.7 | 2.7 | 2.8 | 2.8 |
| (G1) | 0.4 | 0.4 | 0.4 | 0.4 |
| (F1) | | | 0.09 | 0.09 |
| (F2) | 0.1 | 0.1 | | |
| fungus resistance test (after about one-equivalent year) | 4 | 0 | 0 | 0 |
| fungus resistance test (after about five-equivalent years) | 4 | 0 | 3 | 0 |
| bleaching (after about one-equivalent year) | 1 | 3 | 1 | 3 |
| compression permanent set (%) | 82 | 82 | 71 | 76 |

This patent application claims priority to Japanese Patent Application No. 2016-193000 (Sep. 30, 2016 filed), which is hereby incorporated by reference in its entirety.

The invention claimed is:

1. A thermoplastic elastomer composition comprising the following component (A-2), the following component (B) and the following component (C), wherein
the content of the component (A-2) is 5 parts by weight or more and 95 parts by weight or less with respect to 100 parts by weight of the total amount of the component (A-2) and the component (B), and
the content of the component (C) is 0.005% by weight or more and 3% by weight or less with respect to 100% by weight of the whole amount of the thermoplastic elastomer composition;
component (A-2): a crosslinked product of a component (A-1);
component (A-1): an ethylene copolymer comprising a monomer unit derived from at least one selected from the group consisting of propylene and α-olefins having 4 or more and 10 or less carbon atoms, and a monomer unit derived from ethylene, and having a Mooney viscosity ($ML_{1+4}$, 125° C.) of 50 or more;
component (B): a propylene polymer having a melt flow rate at a temperature of 230° C. and a load of 21.18 N of 20 g/10 min or less;
component (C): an antifungal agent.

2. The thermoplastic elastomer composition according to claim 1, comprising the following component (E) in an amount of 1 part by weight or more and 100 parts by weight or less with respect to 100 parts by weight of the total amount of the component (A-2) and the component (B);
component (E): a mineral oil.

3. The thermoplastic elastomer composition according to claim 1, wherein the component (C) is an organic nitrogen sulfur compound.

4. The thermoplastic elastomer composition according to claim 1, wherein the component (C) is thiabendazole.

5. The thermoplastic elastomer composition according to claim 1, wherein
when the thermoplastic elastomer composition is hot press-molded at a temperature of 200° C. and a maximum pressure of 10 MPa for 3 minutes, then, cold press-molded at a temperature of 23° C. and a maximum pressure of 10 MPa for 5 minutes, to fabricate a molded article, the compression permanent set thereof measured under the following conditions is 80% or less;
measurement conditions of compression permanent set: the compression permanent set of the fabricated molded article is measured according to JIS K6262 at a test temperature of 70° C., a test time of 22 hours and a compression rate of 25%.

6. A production method of the thermoplastic elastomer composition according to claim 1, comprising
a step (1-1) of melt-kneading the component (A-1), the component (B), the component (C) and the following component (D);
component (D): a crosslinking agent.

7. A production method of the thermoplastic elastomer composition according to claim 1, comprising
- a step (1-2) of melt-kneading the component (A-1), the component (B) and the following component (D), to obtain a composition precursor, and
- a step (2-2) of melt-kneading the composition precursor and the component (C);
- component (D): a crosslinking agent.

8. A molded article comprising the thermoplastic elastomer composition according to claim 1.

* * * * *